United States Patent Office 2,877,886
Patented Mar. 17, 1959

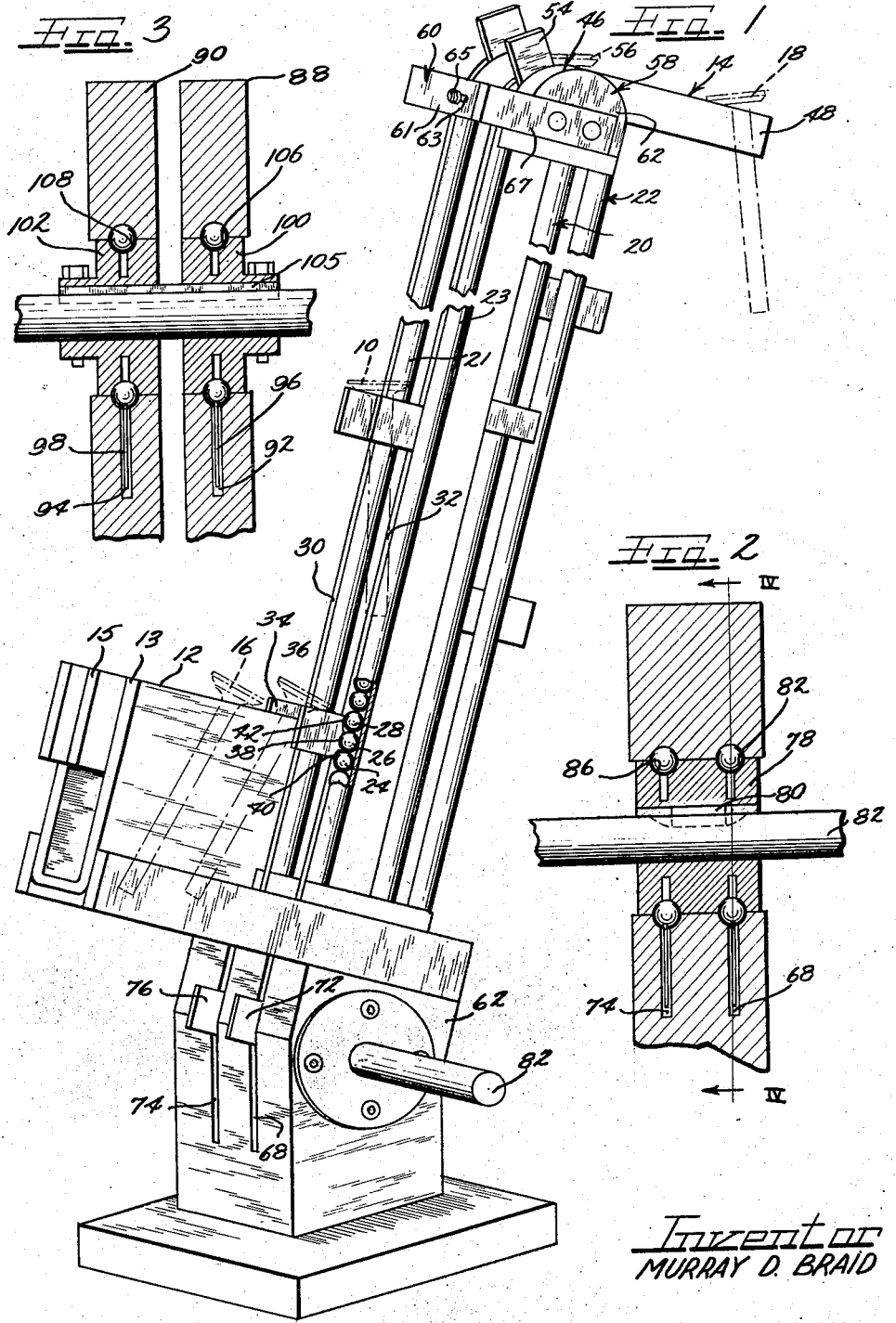

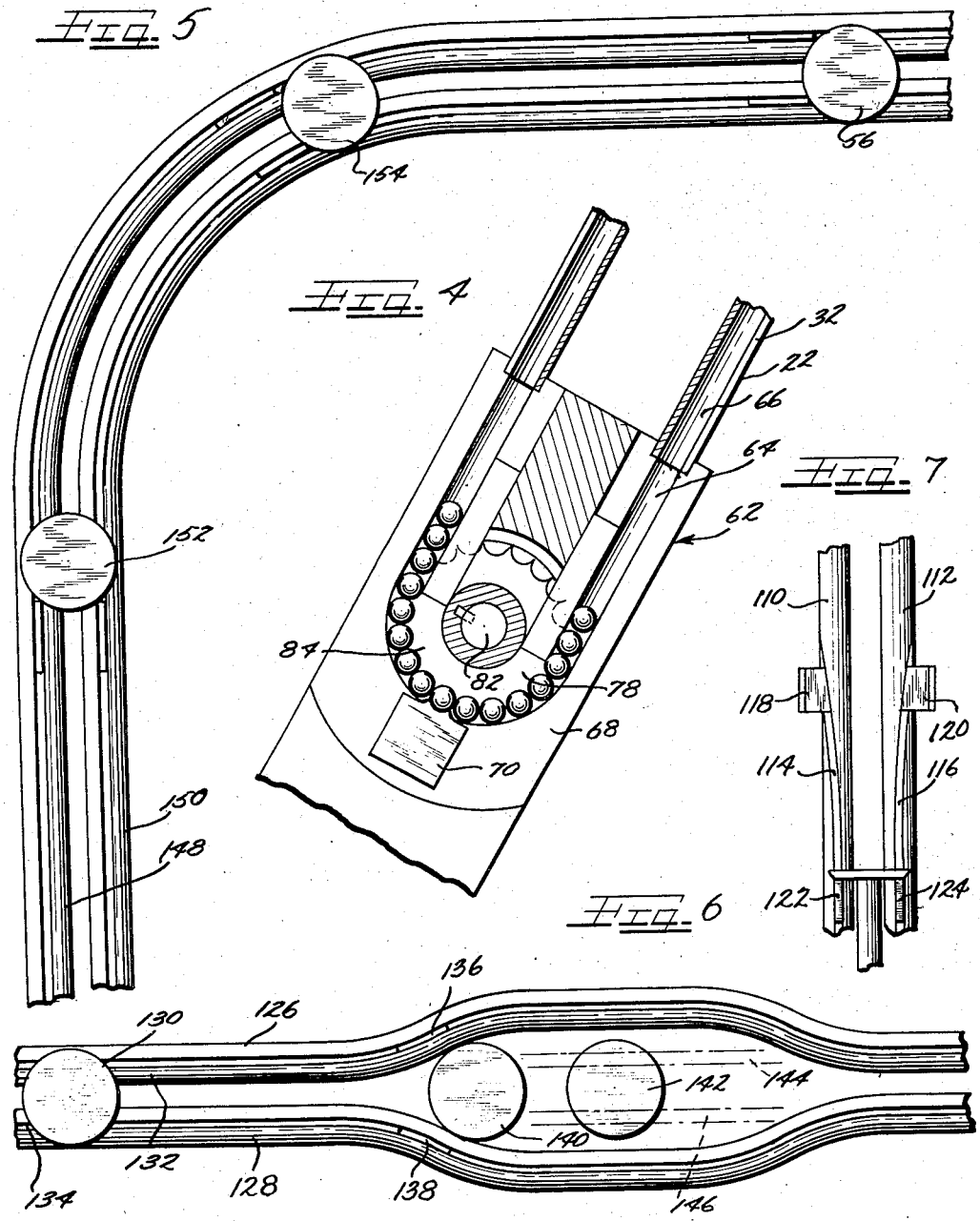

2,877,886

CHAINLESS CONVEYOR

Murray D. Braid, Mentor, Ohio, assignor to Thompson Products, Inc., Cleveland, Ohio, a corporation of Ohio Application February 15, 1956, Serial No. 565,634

5 Claims. (Cl. 198—108)

The present invention relates to improvements in mechanisms for conveying articles.

More specifically the present invention contemplates the provision of a pair of substantially parallel endless tubes. The tubes are shaped and extend along a path so as to convey an article along the desired path. Means are provided to deliver an article to be conveyed to one point along the conveyor tubes and additional means are provided to remove the articles from the path at another point along the conveyor tubes. Within the tubes are spherical balls such as ball bearings, filling each of the tubes in contiguous relationship and being of a size so as to be slidable within the tube but not to pass each other within the tube.

Conveying arms are secured to certain of the balls at spaced intervals to project out through continuous slits in the tubes. A driving member is provided at one location in the tubes to extend into the tube and engage the spherical balls forcing them along through the tube. Their motion is transmitted to each succeeding ball to thereby carry the conveying arms and convey the article to be moved. The tubes may be given various configurations and shaped to convey the article through the proper path and to the proper elevation with respect to the point at which the articles are received. The spacing between the tubes may also be varied to handle different articles and the spacing at certain points may be varied to release the article.

Many types of conveyors are well known to the art such as belt conveyors, chain conveyors and the like which are adapted to carrying articles along a path. These conveyors, although inexpensive and relatively simple, have certain disadvantages in that they must conform to certain restrictions inherent to the type of conveyor. A belt or chain conveyor for example must be provided with a pulley or sprocket at each end so that the endless conveyor will move forward in continuous operation. Between the pulleys and sprockets which carry and drive the belt or chain conveyor, the conveyor must follow a straight line. Minor deviations from this rigid construction can be obtained by adding extra deflecting pulleys or wheels along the path but these too have inherent difficulties in being space consuming and at times are impossible to use.

The present invention contemplates a conveyor which can be used in any location and can carry an article through substantially any path no matter how curved or devious so as to be able to be used in any situation where a space limitation makes the use of an ordinary conveyor impossible, and yet have the advantages of simplicity of construction possessed by chain or belt conveyors.

It is therefore an object of the present invention to provide an improved type of conveyor for conveying articles which is simple and rugged in construction, which requires a minimum of power for operation and which avoids the limitations heretofore present in the conveyors of the type now used.

A further advantage of the invention is to provide a conveyor for conveying articles which can readily be adapted to traverse a curved conveying path so as to be usable in areas where a straight conveying path is not possible.

A further object of the invention is to provide the conveyor which is adaptable to being used for conveying items along a horizontal as well as a vertical path or along a combination of both.

Another object of the invention is to provide a conveyor which will move a pair of article engaging conveyor elements along a path and will control the position and the spacing of these elements at will to alter the position of the conveyed article or to drop the article from the conveyor.

Another object of the invention is to provide a conveyor which is capable of moving parallel conveying elements along a parallel line which is not restricted to a straight line path.

Another object of the invention is to provide a conveyor which can be used as a classifier or a separator for items.

Another object of the invention is to provide an improved simplified conveyor which can be constructed of standard readily available basic machine elements and can be easily altered in strength and size without adding unnecessary cost to the construction of the conveyor.

Other objects and advantages will become more apparent in the following specification and claims taken in connection with the appended drawings in which;

Figure 1 is a perspective view of the conveyor shown in operation;

Figure 2 is a vertical sectional view taken through the base of the conveying apparatus to show the mechanism for driving the conveyor;

Figure 3 is another vertical sectional view taken through the base of a conveyor to show the driving elements and illustrating an alternative type of construction of this unit of the machine;

Figure 4 is a sectional view taken along the line IV—IV of Figure 2;

Figure 5 is a plan view of the conveyor constructed to carry items around a 90° bend;

Figure 6 is a plan view of the conveyor showing the conveyor tubes constructed to separate at a point along the path to discharge the conveyed elements; and Figure 7 is a front elevational view of an alternate embodiment of the invention designed to drop the items along a certain point in the conveyor.

In the embodiment shown in Figure 1, the conveyor is illustrated as a receiving and conveying valves 10 from a delivery mechanism 12 upwardly on the conveyor to discharge them on a slide 14. The particular valves being conveyed are illustrated at 10. The valve in the valve conveyor is shown at 16 and the valve being discharged to the discharge slide is shown at 18. Although the conveyor is illustrated as adapted to convey valves, it may be adapted to convey various items of many sizes and shapes and through various paths as will become more clear from the following description.

The conveyor comprises a pair of endless tubes, ducts, or conduits 20 and 22. Although these conduits may be shaped to follow any desirable path, they are illustrated in Figure 1 as passing up an incline and returning. The tubes 20 and 22 may be made of metal or any suitable material and are preferably rigid so as to withstand the wear and shock of continuous conveying operation. They may also be made of a softer metal so that they can be conformed or bent to the shape desired after being installed in operating location.

Within the tubes are a series of spacing or conveying members shown in the shape of a sequence of spherical balls such as ball bearings 24 with the balls being illustrated 24, 26 and 28. These spherical conveying members are of a size so that they are slidable within the tubes 20 and 22, with tube 20 containing the same type of balls as tube 22, but are of such a size that they cannot slip past each other within the tube. Therefore with the spherical conveying members being in contiguous relationship, when one member is pushed along through the tube all the other members will be forced ahead of it to move likewise. Although the spherical members are provided, such as hardened ball bearings which can withstand continuous operation over a very long period of time without wearing, any type of small conveying member may be employed in which a series of similarly shaped and sized members are used which are unattached to each other, and which may be pushed along within a tube.

Along the upper faces of the tubes 20 and 22 are slots shown at 30 in the tube 20 and at 32 in the tube 22.

Attached to certain of the balls within the conveying tubes at spaced intervals are conveying arms shown at 34 and 36. These conveying arms project outwardly through the slots 30 and 32, and engage the object or article to be conveyed, as shown by the valve 16.

The conveying arms 34 and 36 are secured to the balls such as shown at 26 with the conveying arm 36 being welded to the ball. At the sides of the central portion of the arm 38 which is welded to the ball, are shoulders 40 and 42, with the shoulder 40 resting on the face of the ball 24 behind the ball 26 to which the conveying arm is attached, and with the shoulder 42 resting on the ball 28 ahead of the ball 26 to which the arm is attached. Each of the other conveying arms such as arm 34 is constructed similar to the arm 36 and similarly attached to a ball within the tube 20, and therefore need not be described in detail.

It will be seen from viewing Figure 1 that the arms 34 and 36 project through the slots 30 and 32 substantially parallel to each other and are directly opposite each other being located in the same horizontal plane to support the valves 16 with their heads in a horizontal position so that they will be upright when being conveyed up the vertical portions 21 and 23 of the conveyor tubes. To maintain the arms 34 and 36 in their relative positions the balls in each of the tubes must be conveyed along the tubes at the same speed. For this purpose, and for the economy of construction and simplicity of construction of the tubes and the mechanism for pushing the balls, the balls in each of the tubes are constructed the same size and shape although the structure can be varied to obtain various effects if desired.

As the conveyor arms 34 and 36 move upwardly as pushed forward by the balls in the direction indicated by the arrow 44, the individual valves are carried upwardly until they reach top end of 46 of the conveyor. At that point the conveying arms of the conveyor reverse themselves and swing through 180° and pass downwardly on the backside of the conveyor. For receiving the valves when they reach the top of the conveyor a slide 14 consisting of a pair of bars 48 and 50 is provided. The bars are spaced so they will be positioned just inside of the moving conveying arms 52 and 54 which swing around the top of the conveyor and deposit the valve 56 on the two parallel bars 48 and 50.

Thus, the head of the valve 56 has been resting on the conveyor arms of 52 and 54 during the ascent of the conveyor arms along the length of the conveyor 23. When the valve head reaches the position shown by the valve 56 in Figure 1, the valve head will be deposited on the bars 48 and 50 with the stem of the valve depending downwardly between the bars. Since the bars are inclined downwardly along the slide 14 the valve head will immediately begin to slide down the bars, as shown by the valve 18, to be directed to a location to where the valves are to be delivered.

Thus, the present conveyor which is shown in Figure 1 has been constructed to elevate the valves from the delivery mechanism 12 to the slide 14. Elevation of articles is a common function of a conveyor and finds many uses in industry such as receiving the output of a machine, delivery to an operating machine etc. It will be seen from the later description in connection with Figures 5 and 6, for example, that the conveyor may be adapted readily to various types of other functions, such as conveying articles along horizontal paths of different configurations.

The tubes 20 and 22 which contain the balls or conveying members which carry the conveying arms along their path, are supported at their upper end 46 by a spacing member generally shown at 58. The spacing member consists of a yoke 60 which is generally U-shaped and formed of a pair of legs which extend down each side of the tubes 20 and 22 to be suitably connected thereto. As shown by the member 62, a member such as this may be provided for attachment of the yoke to the tube 22, and a similar member, not shown, used in connection with the tube 20. The legs of the yoke 60 then attach to the connecting members 62 and hold the tubes in their fixed separated positions. The base or cross bar 61 of the U-shaped yoke 60 is separated or spaced sufficiently far from the slot 30 and 32 in the tubes so that the conveying arms 34 and 36 or 52 and 54 may readily pass beneath this cross bar. In some instances the cross bar 61 may be bolted to the legs of the yoke such as by a bolt 65, and the function of the adjustable bolt will be presented later.

The tubes 20 and 22 may be continuous in themselves or they may fit into a supporting base such as shown at 62 in the manner illustrated in the sectional view of Figure 4 in which tunnels are provided to contain the enclosure in which the balls slide. The base 62 has a U-shaped circular tunnel 64 which has the same diameter as the inside 66 of the tube and therefore provides a continuation of the interior of the tube. The primary purpose of the casting 62, in addition to supporting the tubes 20 and 22 at the base, is to house the driving mechanism for pushing the balls along their path within the tubes.

The slot 32 in the tube 22 is continued in the block 62 by a slot 68 which is sufficiently deep to accommodate the conveyor arm 70 as is shown in Figure 4. The block, Figure 1, is provided with a similar slot 74 which is a continuation of the slot 30 in the tube 20 and will accommodate the conveyor arms of that tube.

The balls are driven through the tube by a sprocket drum 78 which successively engages the balls as they pass downwardly through the tube to push them along the tube. Since the tubes are completely filled with the balls, the force applied at one point in the tube to push the balls along will keep all of the balls moving through the entire tube. For clarity of drawing, some of the balls are omitted from the tube in Figure 4 but it will be understood that the tubes are filled. The driving means for the balls is shown in Figures 2 and 4 as a rotary sprocket drum 78 connected by a key 80 to a drive shaft 82. The drive shaft is rotated at the desired speed by a motor or other suitable operating mechanism, not shown. The sprocket cylinder 78 is fitted with a series of two rows of peripherally arranged semi-spherical hollows 82 in which the balls are received as the drum 78 rotates. Thus, as the drum rotates in the direction of the arrow 84 the balls are carried downwardly with the rotating drum, each successive ball fitting into a successive semi-spherical hollow 82 to be pushed by the rotating drum. The hollows 82, as are shown in Figures 2 and 4, carry the balls for the tube 22 and the hollows 86 carry the balls for the tube 20. When a ball carrying a pusher arm, such as 70 shown in Figure 4, arrives at the driving cylinder 78 the arm passes freely through the slot 68 and does not impede the driving operation of the driving cylinder 78.

The slots 68 and 74 through which the conveyor arms pass are sufficiently narrow, so as to be of substantially less width than the diameter of the balls, so that the balls will be retained in the groove to be retained in the hollows in the driving cylinder.

It will be seen that various arrangements can be adapted for driving the balls, for example, a sprocket might be positioned in a slot with teeth extending into the tubular tunnel 64 with the sprocket pushing the balls along through the continuous conduit.

The tubes 20 and 22 are shown spaced apart a fixed distance so that the carrying or conveying arms 34 and 36 are spaced a proper distance to engage the heads of valves 16 and carry them up the inclined conveyor. In some instances it may be desirable to provide a conveyor in which the distance between the tubes is adjustable to readily adjust the conveyor for carrying other items, or for carrying articles of different or varying size. For this purpose, the drive means for the balls and a support for the tubes can be made adjustable. The cross bar 61 of the U-shaped yoke 60 may be provided with an elongated slot 63 which receives the bolt 65 threaded into the side of the U-shaped yoke 67. By loosening the bolt 65 the distance between the tubes 20 and 22 can be varied by sliding the bolt 65 along in the slot 63.

In most cases, it will be desired that the tubes will be kept parallel and the lower ends of the tubes be adjusted to have a spacing equal to the spacing at the upper end. For this purpose, the driving drum is separated into two parts as is shown in detail in Figure 3. The block, which is shown in Figure 1 at 62, is split in this instance, Figure 3, into two sections 88 and 90. The block 90 carries the drive for moving the balls within the tube 20 and the block 88 carries the drive for moving the balls within the tube 22. The tubes will be connected to the block in the same manner as shown in Figure 4, and each of the blocks will be provided with a round tunnel and slot 92 and 94, in order that the blocks 88 to 90 respectively may accommodate the conveyor arms 96 and 98. The driving cylinder shown at 78 in Figures 2 and 4 is split into two sections 100 and 102. Each of the cylinders is keyed to the drive shaft 82 by a common key 105 in the drive shaft 104. The key 105 permits the driving cylinders to be slid back and forth on the drive shaft 104 as the spacing between the blocks 88 and 90 is adjusted thus adjusting the distance between the tubes and hence between the carrying arms. Each of the cylinders carries a series of semispherical pockets 106 and 108 arranged peripherally around the cylinder to successively receive the balls as they flow along the tube. Thus, as each of the cylinders is driven at an equal speed, being driven by the common shaft 104, the balls in each of the tubes will be driven at the same speed to retain the same relative position between the conveying arms which are attached to the balls.

Although as shown in Figure 1, the slots 30 and 32 are positioned in the outer face of the tubes, i. e., so that the pusher arms will project outwardly from the tubes at the 180° bends, the slots may be placed at any location in each of the tubes. Further, the slots in each of the tubes may be positioned at different locations providing the ball driving mechanism and the connections for supporting the tubes are constructed so that the conveying arms will not interfere, but will have a slot or space to pass through.

Another arrangement which may be adopted is to alter the position of the slot in one of the tubes along its length so that it will not continually extend in a straight line. For example, the slot 32 might be arranged to curve outwardly someplace along the tube, and since the balls within the tubes 24, 26 and 28 are unattached to each other the balls may twist about an axis parallel to their path of travel, and the conveying arm can swing with the twisting balls. When the curved portion of the slot is reached by the conveyor arm, it will swing away from the opposite conveyor arm to thereby drop the article which is carried therebetween.

This arrangement is shown in Figure 7 which shows an elevated view with the tubes 110 and 112 bearing the slots 114 and 116. The slots are curved outwardly at a location along the tube and at that point the conveyor arms 118 and 120 will spread apart to drop the carried item whereas they are maintained in their properly spaced positions before they reach this location in their tube, and are in the carrying position at 122 and 124.

Another way of releasing the articles being conveyed is illustrated in Figure 6, which is a plan view. In that figure the tubes 126 and 128 maintain their parallel relationship for a portion of the path, and then are spread apart so that the conveyed articles 130, 140 and 144 will drop between the tubes and be released. At the location 130, for example, a valve is carried by the tubes being pushed along by the conveyor arms 132 and 134. At the location where the tubes are spread, the conveyor arms 136 and 138 no longer push the valve since it drops between the tubes as illustrated by the valve 120 with the previously dropped valve being shown at 142. The valves may be dropped in a container bin or the like, or may be dropped in a chute or on a pair of ways, as shown generally by the spaced slides 144 and 146.

For conveying articles through curved paths such as through a linear path turned through a bend of 90° the arrangement illustrated in Figure 5 may be used. Here the tubes 148 and 150 are bent through an angle of 90° so that the valves 152, 154 and 156 are carried through a path varying through 90°.

In this arrangement however, if the balls within the tubes are pushed along at the same speed in the two tubes, the balls in the outer tubes 148, having to cover a longer distance in the 90° bend, will drop slightly behind the balls in the tube 150. Normally speaking the lag in the balls of one tube will be so small that it will make little difference in the operation, and the valve will continue to be carried along the tubes. The balls in the right tube 150 shown in Figure 5 may originally be arranged to lag slightly behind the balls in the tube 148 so that their gain on the balls of the left tube will be partially compensated for. Of course, if the tube is bent around a 90° angle to the other direction, later in the path of travel, the compensation will be automatic and at the second bend the pusher members will again be exactly opposite each other.

The arrangement of Figures 5 and 6 shows the flexibility of the conveyor and indicates its practicality in installations in crowded industrial spaces. Frequently, conveying operations will have to be performed in a limited space and it is not always possible to convey in a straight line in this limited space. With the use of belt conveyors, chain conveyors, and other conveyors of the conventional type a straight line conveying operation must be used, and this will frequently be impossible or require a rearranging of the surrounding machinery. With the present conveyor, however, the tubes can readily be shaped or formed to almost any contortion and the items conveyed can be arranged to follow the tortuous path in and out of other machinery, between belts, gears, drive shafts, fly wheels and other machine elements without the slightest bit of difficulty.

Since round smooth ball bearings are used within the conveyor tubes, the frictional losses are extremely small and very little driving force is needed to operate the conveyor. The conveyor, therefore, may be extended to relatively long lengths, and since various shapes and paths can be assumed there is practically no limitation to the length than can be assumed for the conveyor.

Although the arrangement illustrated in Figure 6 may primarily be used to drop the items conveyed, it will readily be seen that this may be used as a classifying or separating arrangement where articles of different sizes are to be conveyed. The tubes can be spread apart a predetermined distance so that the unwanted items will be dropped between the tubes whereas the wanted items will be retained on the tubes, and thus, a classifying operation will be automatically performed while the items are being conveyed.

The tubes may be formed of soft materials such as copper, brass, or the like so that they may, if desired, be bent or formed after being installed. This makes the conveyor extremely adaptable in varying circumstances.

Although the operation will be clear from the foregoing description of the structural elements a brief résumé of the operation will prove helpful in understanding the overall objectives and features of the invention. The conveyor in Figure 1 is shown for conveying items such as valves, illustrated at 16. The valves are supplied to the conveyor by a chute illustrated in the form of a pair of spaced ways 13 and 15. The valves slide down on these ways and as each of the conveying arms 34 and 26 pass upwardly spaced outside of the ways they will engage the head of the valve 16 carrying it upwardly along the inclined tubes 20 and 22. The valves will continue to be conveyed upwardly as shown by the valve 10 until they reach the top of the conveyor whereupon a pair of spaced parallel slides 48 and 50 intercede between the arms 52 and 54 of the conveyor and receive the valve heads therefrom so that the valve 56 slides down the slide to the position of the valve 18.

The conveying arms are secured to spaced balls such as 26 within the conveyor tubes. These balls are driven along inside the conveyor tubes which form a conduit for the balls and with the balls inside of each of the tubes are driven at an equal speed. The balls are separate and unattached and generally will move along inside the conveyor with a minimum of friction loss.

For driving the balls within the conveyor, as is shown in Figure 4 a driving cylinder 78 is provided which is fitted with a series of peripherally arranged semi-spherical sockets or openings 82. These openings successively receive the balls as they pass through the tubes, and as the cylinder 78 rotates, being driven by the drive shaft 82 the balls will be pushed forward along the tube. The base casting 62 within which the rotating cylinders are housed have a continuous slot 68 which is a continuation of the slots 30 and 32 in the tubes so that the conveying arms 70 may pass the block unimpeded thereby.

Thus, it will be seen that I have provided an improved conveyor which meets the advantages and objectives hereinbefore set forth and provides a simple, expedient, long-wearing and reliable new type of conveyor.

I have in the drawings and specification, presented a detailed disclosure of the preferred embodiment of my invention, but it is to be understood that I do not intend to limit the invention of the specific form disclosed but intend to cover all modifications, changes and alternative constructions and methods falling within the scope of the principles taught by my invention.

I claim as my invention:

1. A conveyor mechanism comprising in combination a pair of tubes extending along a conveying path, a plurality of spherical balls in each of the tubes of a size to be slidably contained therein, slots extending along each of the tubes, conveying arms attached at spaced locations to the spherical balls and projecting through the slots to engage articles to be conveyed, said slots extending parallel for a portion of the length of the tube and then diverting to direct the path of movement of the arms to vary their spacing whereby the article conveyed is released and again diverting within said path to return the arms to their original spacing, and means to move the spherical balls through each of the tubes at a substantially equal speed.

2. A conveyor mechanism comprising in combination a sequence of small conveying members being of similar size and shape and positioned to be in contiguous relationship to each other, a duct for guiding the conveying members and having a slot, the duct being of a diameter to contain the conveying members in contiguous relationship whereby they will not pass each other or escape through the slot, a second set of conveying members in contiguous relationship, a second duct for guiding the conveying members and having a slot, the second duct being formed of a diameter to prevent the conveying members from passing, each of said ducts being endless and defining a first conveying path and a second return path, the ducts reversing in direction for substantially 180° at the end of each path to begin the other path, and separate conveyor arms attached to spaced conveying members in each of the ducts and projecting through the slots to engage articles to be conveyed, said ducts extending parallel for a distance along said first conveying path whereby the spacing of said conveyor arms remains constant and widening for a relatively short distance within said path whereby the spacing between said conveyor arms changes to release the object conveyed by the arms and again returning to the parallel relationship and the same spacing for the rest of said first path and for said second return path.

3. A conveyor mechanism comprising in combination a sequence of small individual unattached conveying members being of similar size and shape, a second sequence of small conveying members being unattached and of similar size and shape, first and second guide tubes extending along a substantially straight conveying path and containing conveying members, slots along the tubes, and conveying arms projecting through each of the slots and attached to the conveying members for being moved therewith to engage objects to be conveyed, said tubes and slots extending substantially parallel along the major portion of the path and shaped to separate the conveying arms for a short distance along said path whereby the object conveyed will be dropped and return the conveying arms to their original spacing for the rest of the path, and means for moving the conveying members along said tubes at a substantially equal rate of speed in each of the tubes.

4. A conveyor mechanism comprising in combination a sequence of small individual unattached conveying members being of similar size and shape, a second sequence of small conveying members being unattached and of similar size and shape, first and second guide tubes extending along a substantially straight conveying path and containing conveying members, slots along the tubes, and conveying arms projecting through each of the slots and attached to the conveying members for being moved therewith to engage objects to be conveyed, said tubes and slots extending substantially parallel along the major portion of the path, at least one of said slots shaped to guide the conveying arms projecting therethrough laterally relative to the other conveying arms for a portion of said path whereby an object carried by the arms may be dropped and the slot is shaped to subsequently return the arms to their original spacing for the rest of the path, and means for moving the conveying members along said tubes at a substantially equal rate of speed in each of the tubes.

5. A conveyor mechanism comprising in combination a sequence of small individual unattached conveying members being of similar size and shape, a second sequence of small conveying members being unattached and of similar size and shape, first and second guide tubes extending along a substantially straight conveying path and containing conveying members, slots along the tubes, and conveying arms projecting through each of the slots and attached to the conveying members for being moved therewith to engage objects to be conveyed, said tubes and slots extending substantially parallel along the major portion of the path, at least one of said tubes shaped to guide the conveying members contained thereby and the conveying arms attached thereto laterally relative to the conveying arms of the other tube for a portion of said path and shaped to subsequently return the arms to their original spacing for the rest of the path, and means for moving the conveying members along said tubes at a substantially equal rate of speed in each of the tubes.

References Cited in the file of this patent

UNITED STATES PATENTS

| | | |
|---|---|---|
| 572,110 | Gray | Dec. 1, 1896 |
| 1,444,919 | Hoy | Feb. 13, 1923 |
| 2,016,564 | Voelkel | Oct. 8, 1935 |
| 2,264,549 | Pecker | Dec. 2, 1941 |
| 2,387,220 | Wehle | Oct. 16, 1945 |
| 2,424,055 | Rousseau | July 15, 1947 |
| 2,517,444 | Rousseau | Aug. 1, 1950 |
| 2,594,207 | Pierce | Apr. 22, 1952 |
| 2,649,675 | Schrage | Aug. 25, 1953 |
| 2,650,459 | McGinley | Sept. 1, 1953 |
| 2,738,765 | Hart | Mar. 20, 1956 |